United States Patent
Levin et al.

[11] Patent Number: 6,130,923
[45] Date of Patent: Oct. 10, 2000

[54] LOCK DETECTION FOR MULTIPATH WIRELESS RECEIVER

[75] Inventors: Jeffrey A. Levin; Christopher C. Riddle; Tom B. Sherman, all of San Diego, Calif.

[73] Assignee: QUALCOMM Incorporated, San Diego, Calif.

[21] Appl. No.: 09/209,356

[22] Filed: Dec. 11, 1998

[51] Int. Cl.[7] .................................................. H04L 1/02
[52] U.S. Cl. ........................ 375/347; 375/349; 375/130
[58] Field of Search .................................. 375/130, 144, 375/349, 140, 347; 370/332, 335; 455/137

[56] References Cited

U.S. PATENT DOCUMENTS

| | | | |
|---|---|---|---|
| 4,894,842 | 1/1990 | Broekhoven et al. | 375/1 |
| 4,901,307 | 2/1990 | Gilhousen et al. | 375/18 |
| 5,056,109 | 10/1991 | Gilhousen et al. | 375/1 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/1 |
| 5,361,276 | 11/1994 | Subramanian | 375/1 |
| 5,442,627 | 8/1995 | Viterbi et al. | 370/22 |
| 5,490,165 | 2/1996 | Blakeney, II et al. | 375/205 |
| 5,561,618 | 10/1996 | Dehesh | 364/725 |
| 5,644,591 | 7/1997 | Sutton | 375/200 |
| 5,654,979 | 8/1997 | Levin et al. | 375/206 |
| 5,703,902 | 12/1997 | Ziv et al. | 375/200 |
| 5,761,204 | 6/1998 | Grob et al. | 370/467 |
| 5,764,687 | 6/1998 | Easton | 375/206 |
| 5,764,688 | 6/1998 | Hulbert et al. | 375/206 |
| 5,793,796 | 8/1998 | Hulbert et al. | 375/347 |
| 5,805,648 | 9/1998 | Sutton | 375/367 |

FOREIGN PATENT DOCUMENTS

| | | | |
|---|---|---|---|
| 9413066 | 6/1994 | WIPO | H04B 1/66 |
| 9512262 | 5/1995 | WIPO | H04J 13/00 |

*Primary Examiner*—Temesghen Ghebretinsae
*Attorney, Agent, or Firm*—Tom Streeter; Brian S. Edmonston; Philip Wadsworth

[57] ABSTRACT

A wireless receiver receiving multipath Wash-code symbols determines which of fingers 402, 410 have locked on a signal. Measurements of the correlation energies between the received signal and all possible symbols are stored in energy storage units 404, 412. The actual signals are combined in combiner 408. A maximum determiner 416 determines the most likely combined symbol, and an index for this symbol is fed back to the energy storage units. Lock detectors 406, 414 use the measurement for this fed-back symbol to determine whether the finger has locked onto a path. This determination is used to decide whether the next signal detected by that finger should be applied to the combiner.

3 Claims, 4 Drawing Sheets

ENVIRONMENT

LOCK DETECTION FOR MULTIPATH WIRELESS RECEIVER

TECHNICAL FIELD

This invention relates to wireless telephony, in particular to rake receiver architecture, and has particular relation to detecting whether a wireless receiver (in particular, a rake receiver using n-ary orthogonal signaling) has locked onto a significant multipath signal.

BACKGROUND ART

FIG. 1 shows the problem 100 to be solved—and the opportunity 100 to be exploited—when a transmitter 102 and receiver 104 are in wireless communication. Some of the signal—perhaps most of it—will travel line-of-sight from transmitter 102 to receiver 104. However, some may reflect off an obstacle (such as first building 106) before being received. There may be several obstacles (such as second building 108), each providing the signal with a different path from transmitter 102 to receiver 104. This is a problem, since the signals may arrive out of phase and interfere destructively. This is also an opportunity, if the signal strength from each path can be combined in a constructive manner. It is also an opportunity in that line-of-sight communication is no longer mandatory. To combine the independent paths in a constructive manner, it is important to be able to identify an independent path, that is, to distinguish a path from background noise.

FIG. 2 shows the conventional apparatus 200 for exploiting this opportunity. A receiver receives signals over multiple paths, each of different length, and therefore slightly offset in time. Each provides the same signal as the others but with different signal strength and noise. Several demodulators 202, 210, conventionally known as "fingers," are set to match these offsets. First finger 202 passes a demodulated received signal to first maximum energy detector 204. First maximum energy detector 204 detects the channel symbol (described below) having the most correlation energy with respect to the received signal, and passes a measurement of that energy to first lock detector 206. If this maximum energy exceeds a predetermined threshold or passes some other convenient test for significance, then the demodulated signal is significant and is applied to a combiner 208 by the first lock detector 206. If this maximum energy does not pass this test, then the demodulated signal is deemed to be noise and is not applied to the combiner 208 by the first lock detector 206.

Second finger 210 similarly has its output controlled by second maximum energy detector 212 and second lock detector 214. Only two fingers are shown in FIG. 2, but any convenient number may be used. Three or four fingers are typical in conventional technology.

The combiner 208 combines these demodulated received signals into a combined signal. It should be noted that it combines the signals, as distinct from combining the channel symbols. An output maximum detector 216 takes the combined signal and detects the channel symbol having the most correlation energy with respect to the combined signal. It passes on, for further processing 218, an index for this maximum energy channel symbol, together with a measurement of the energy of that channel symbol. The combined signal is passed on, for further processing 218, as well.

FIG. 3 shows the orthogonal signaling scheme used for data validation in the exemplary system. Other orthogonal and non-orthogonal n-ary methods are possible.

A group of 6 binary code channel symbols are taken together and transmitted as a single channel symbol. There are then 64, or $2^6$, possible channel symbols. An orthogonal set of 64 waveforms, each waveform having a zero correlation with the other waveforms in the set, is chosen. Each channel symbol is composed of 64 bits, conventionally known as "channel chips." One popular set of 64 waveforms is the set of so-called "Walsh functions," but other waveforms may be used if desired.

A Walsh function is generated by converting a decimal number 302 to a binary number 304 and forming the 2×2 matrix shown as 306 in the upper left corner of a matrix 308. This is repeated in upper right 310 and lower left 312 corners, and inverted in the lower right corner 314. Matrix 308 is then repeated in upper right 318 and lower left 320 corners, and inverted in the lower right corner 322. This process is continued until a row of the desired length (64) is obtained. Walsh functions are orthogonal to one another in the sense that, on a channel chip by channel chip matching, each pair of Walsh functions has 32 channel chips which match and 32 channel chips which differ.

64 channel chips is likewise a popular length for a channel symbol, but any other length (preferably a power of 2) may be used if desired. There being 64, or $2^6$, possible channel symbols, each channel symbol may be assigned an index, and the index will have only 6 bits. Longer or shorter channel symbols will have longer or shorter indices. "Index," "channel symbol index," "Walsh code index," and "Walsh index" are all synonymous as used in this application.

In the receiver, each finger implements 64 correlations of the received signal—one correlation for each channel symbol in the possible transmitted set. For a single-path receiver, the correlation with the highest energy is the most likely transmitted channel symbol. For a multi-path receiver, the correlation energies for each finger are scaled and piecewise combined to make a combined set of 64 energies. At this point, the highest energy indicates the channel symbol which was most likely transmitted. Note that this channel symbol is not necessarily the most likely channel symbol that would be reported from any individual finger.

To determine whether a finger is actually assigned to a valid signal path, an energy metric is generated and compared against a threshold. Each finger takes the highest energy over the set of 64 possible channel symbols and applies that as an input to a lock detect mechanism. The lock detect mechanism typically applies a low-pass filter to these inputs and then compares the LPF output to a threshold. If the filtered energy is above the threshold, then the finger is declared in-lock and it is allowed to contribute to the demodulation. If the filtered energy is below the threshold, then the finger is declared out-of-lock and it is not allowed to contribute to the demodulation. Both IIR and FIR low pass filters may be used. In addition, multiple energy thresholds can be used to differentiate the go-into-lock state transition from the go-out-of-lock transition.

BRIEF DISCLOSURE OF THE INVENTION

Applicants have improved on this structure by noting that, under conventional technology, a finger may be giving a spurious indication that its output is significant and should be considered by the combiner. To be more specific, ideally the Walsh code that was actually transmitted would be used. The Walsh code determined by the combiner is the most reliable decision (at least before Viterbi decoding) as to which Walsh code was actually transmitted, therefore this is what we use. The Walsh code determined by the combiner is more reliable than the Walsh code which generated the maximum correlation energy per-finger. Conventional technology is to determine a finger's significance by determining the significance of the channel symbol which produces the highest correlation energy. The better way—the way of the present invention—is to look to the actual past rather than to the estimated present. When the finger processes a received signal, it stores the energies of all possible channel symbols. When the downstream combiner determines the most likely combined symbol, an index for this combined symbol is fed back to the finger. Within the finger, the stored energy for that combined symbol is recalled. It is this symbol's energy—rather than the symbol with the greatest energy—which is used to determine the finger's significance. This significance determination is not used to reprocess the signal which generated it. Instead, it is used during the processing of the next signal.

DETAILED DESCRIPTION

Figure 1:
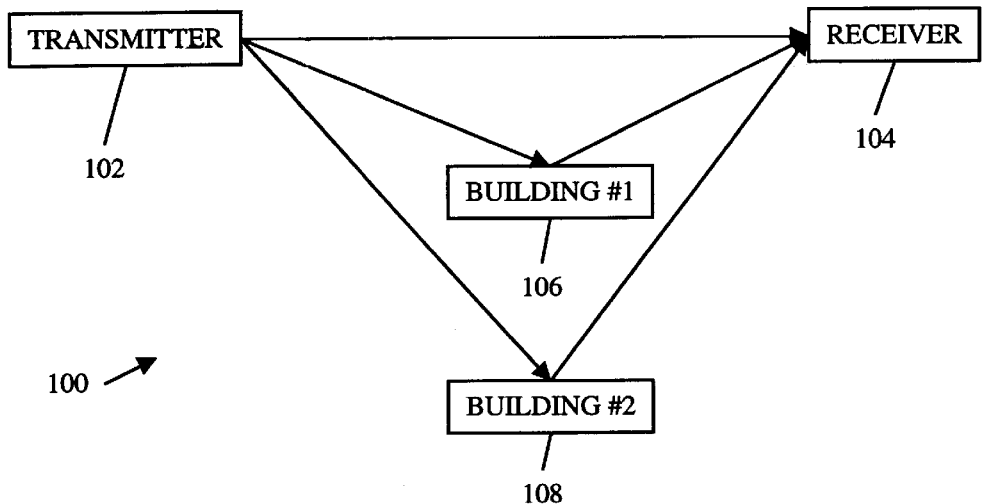
FIG. 1 shows the problem to be solved.
Figure 2:
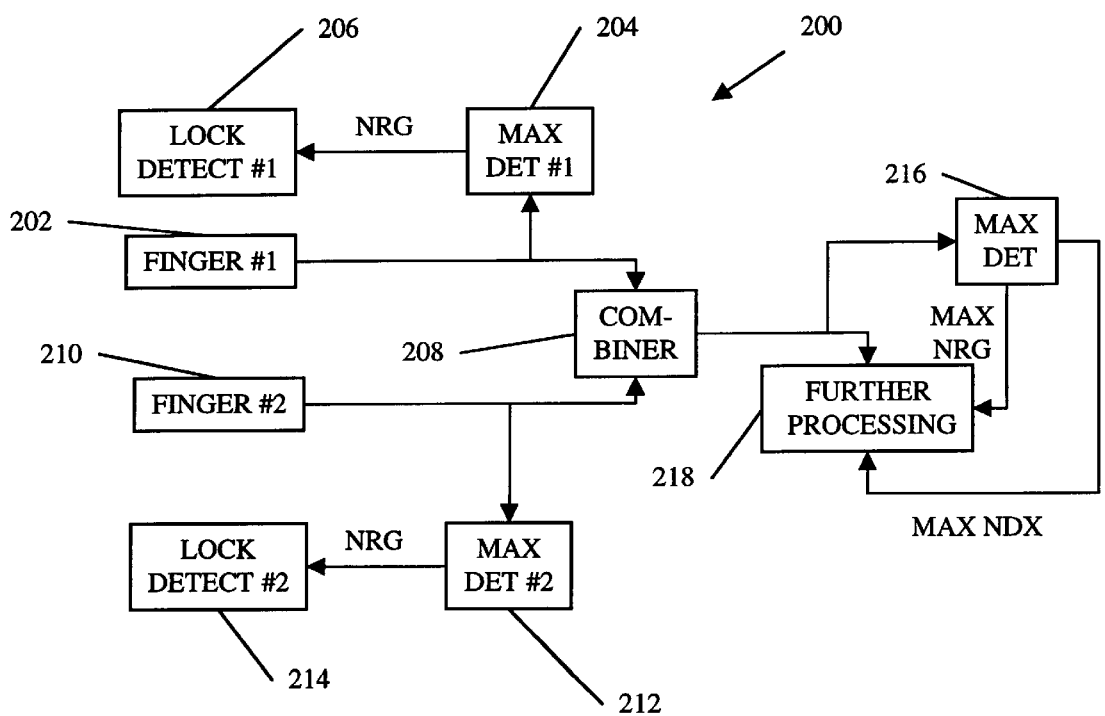
FIG. 2 shows the conventional apparatus for solving the problem.
Figure 3:
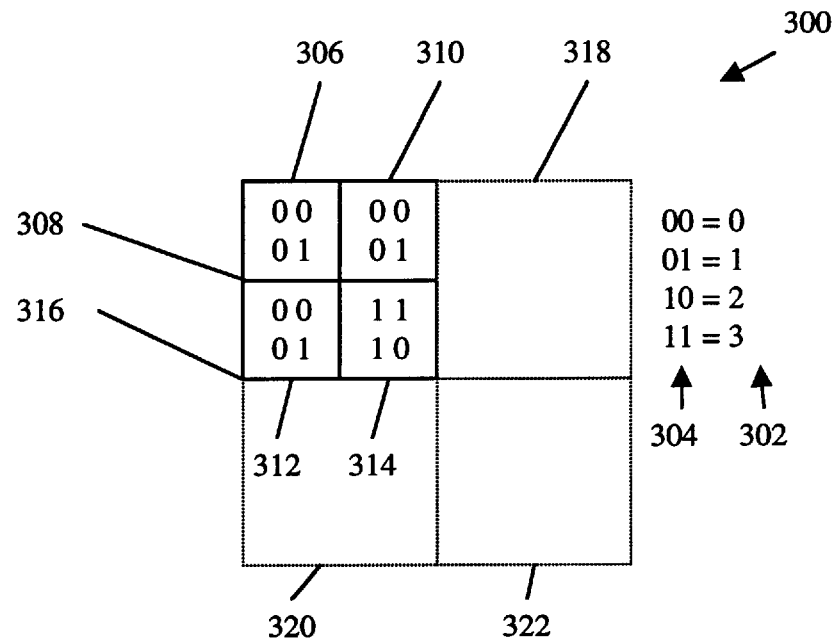
FIG. 3 shows how Walsh codes are generated.

FIGS. 1–3 show the prior art and have been adequately discussed above.

Figure 4:
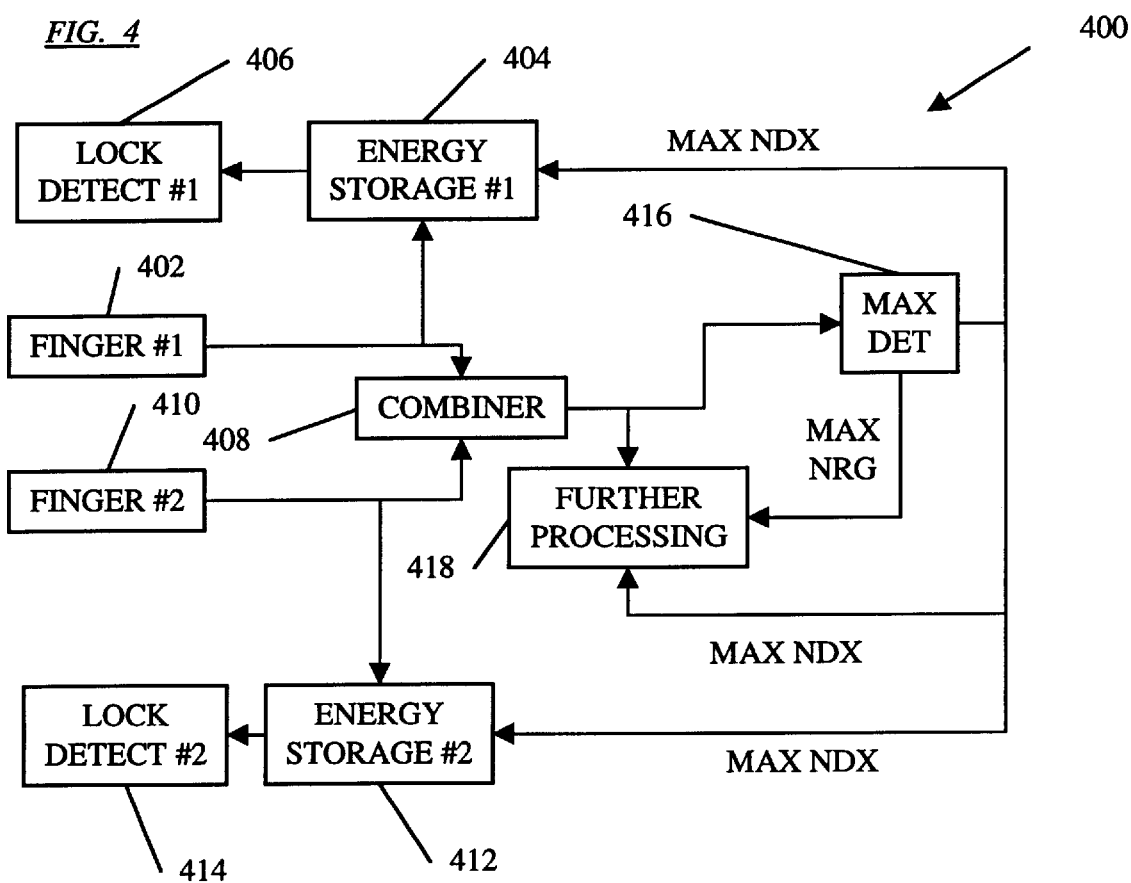
FIG. 4 shows an apparatus for carrying out the present invention.

FIG. 4 shows an apparatus 400 for carrying out the present invention. It is identical to FIG. 2 (even to the point of carrying the same reference numerals, incremented by 200), with two exceptions. First, FIG. 2's maximum detectors 204, 212 have been replaced with energy storage units 404, 412. Second, the index (MAX NDX) for the channel symbol having the maximum energy (MAX NRG) is not only passed on for further processing 418, but also is fed back to the energy storage units 404, 412.

The function of the energy storage units 404, 412 is to store a measurement of the correlation energy of each of the possible channel symbols with respect to a previous received signal. That way, the energy storage units 404, 412 are ready when the output maximum detector 416 determines the maximum index, that is, the index of the channel symbol which was most likely transmitted. The energy storage unit looks up the measurement of the energy of that channel symbol, and passes on that measurement to the lock detector 406, 414. If the lock detector, based on this measurement, determines that the finger 202, 210 really has locked onto a valid multipath, then it allows the next-received signal to be applied to the combiner 408. Note that it is the next-received signal—and not the current signal—which is determined to be applied (or not applied) to the combiner 408. The current signal was determined to be applied to the combiner 408 because previous signals had determined that the finger was in lock. New signals are received much more frequently than a finger goes into- and out-of-lock. Therefore, it is almost always true that a finger which was in-lock for the preceding signal will still be in-lock for the current signal, and vice versa. More importantly, keying on the previous actual signal is more accurate than keying on the current estimated signal.

The invention thus describes a feedback approach where the lock detectors (412–416) are updated by the current symbol. However, it does not additionally determine if the current symbol is to be combined. This would lead to an iterative approach with a potential stability issue if the combined Walsh index never converges. Applicants' approach is to update the lock detectors with the current symbol, but the updated lock status only affects the combining of FUTURE symbols. In this way, no iterative approach is needed to update the lock detectors and combiner.

Figure 5:
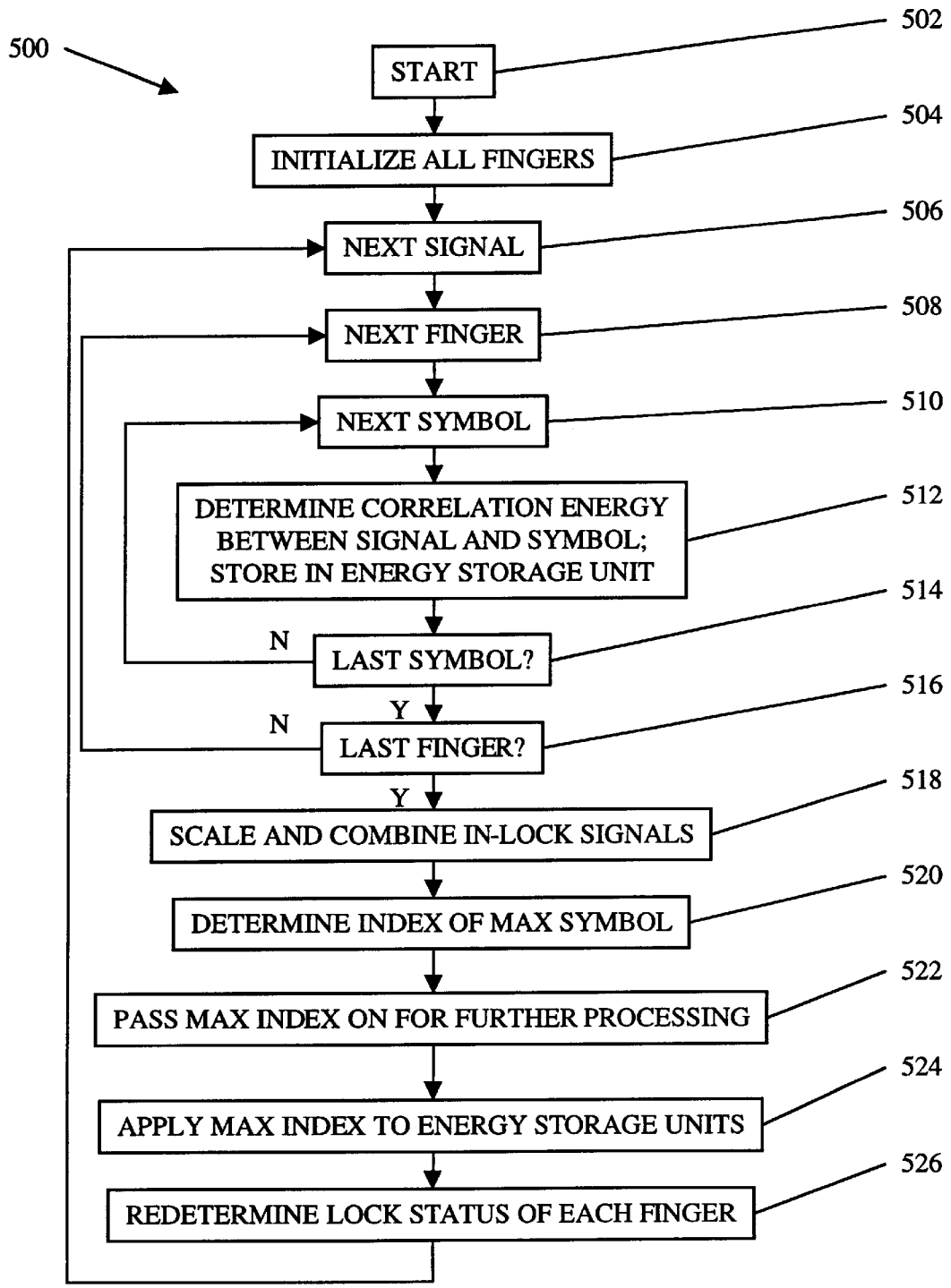
FIG. 5 is a flow chart showing the operation of the apparatus of FIG. 4.

FIG. 5 is a flow chart 500 showing the operation of the apparatus of FIG. 4. From the start 502, all fingers are initialized 504. Initialization includes determining which fingers are in-lock. This initial determination may use an entirely conventional algorithm. The signal is received 506 on each finger 508, and is there compared 510 against the next channel symbol in the library of channel symbols. The comparison includes determining 512 the correlation energy between the signal and the candidate channel symbol, and storing a measurement of the correlation energy in an energy storage unit. If the candidate channel symbol is not the last channel symbol in the library 514, then the next channel symbol is selected; if it is, then the next finger is selected 516. If the finger is the last finger, then we know that the energy storage unit associated with every finger has a list of the correlation energy between the signal (as received on that finger) and each of the possible channel symbols in the library.

The signal takes a different path to be received by each finger which has been declared to be in-lock, and therefore generally arrives with a different power. These different power levels are scaled to a single level 518 and the scaled signals from the in-lock fingers are combined. The combined signal is then compared with each channel symbol in the library, and the channel symbol whose comparison yielded the maximum correlation energy is determined 520. The index of this channel symbol is passed on for further procession 522. The index of this channel symbol is also fed back to the energy storage units 524. The energy associated with this fed-back channel symbol index—as distinct from the largest energy in the energy storage unit—is used to determine 526 whether the finger associated with that energy storage unit is in-lock or out-of-lock. This determination—as distinct from the determination made on initialization 504—is used on the next signal 506.

Figure 6:
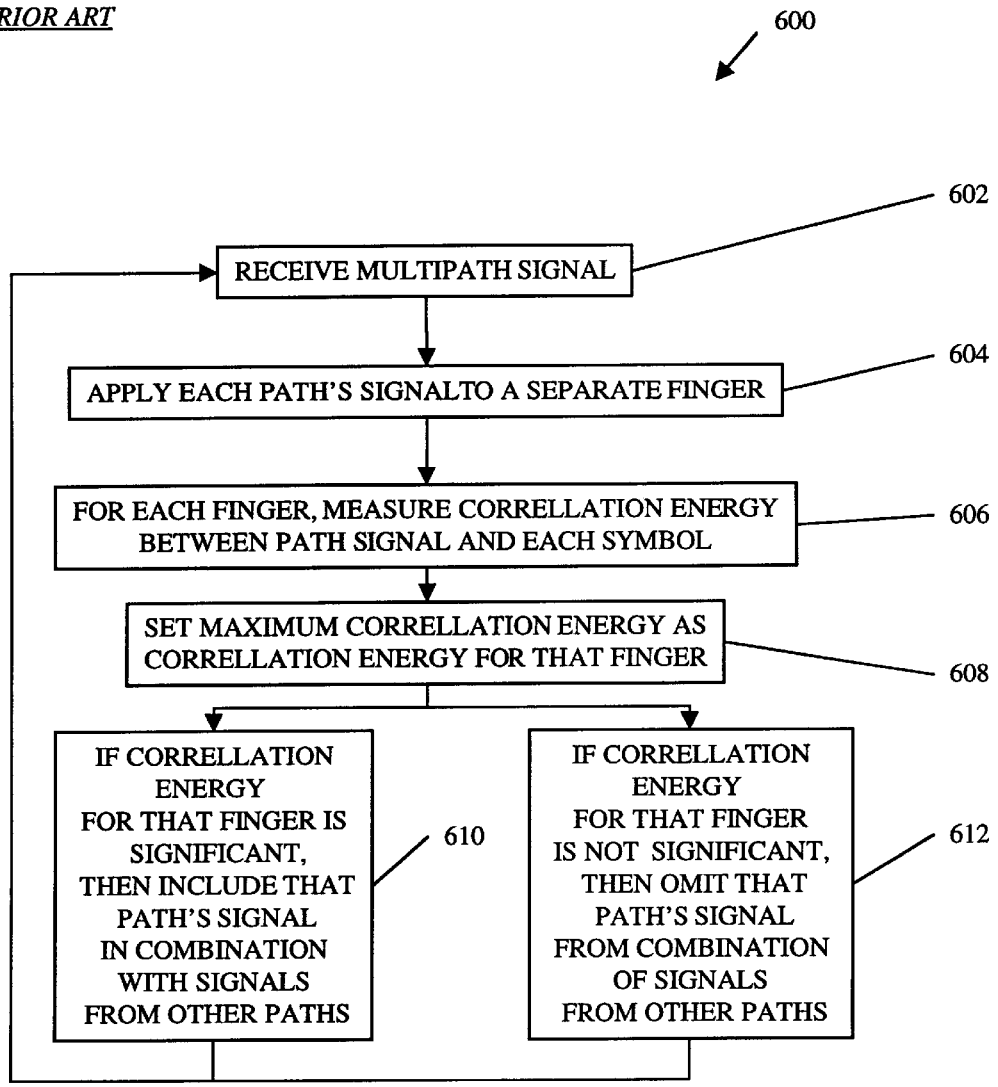
FIG. 6 is a flow chart showing the operation of the apparatus of FIG. 2.

FIG. 6 is a flow chart 600 showing the operation of the conventional apparatus of FIG. 2. When a multipath signal is received 602, each path's signal is applied to a separate finger. In each finger, this signal is compared with each possible channel symbol 606, and the correlation energy resulting from this comparison is measured. The maximum correlation energy is set as the correlation energy for that finger 608. If a finger's energy is significant (under any convenient significance test, which may be entirely conventional), then the signal from that finger is combined 610 with other significant signals for further processing. If it is not significant 612, then it is excluded from the combination.

It sometimes happens that some of the multipath signals are strong, some are weak, and that there are no signals of intermediate strength. In this situation, the present invention and the prior art will produce the same result: combine the strong signals and omit the weak ones. With intermediate strength signals, however, the present invention selects the most significant signals rather than the strongest signals. The index which is passed on for further processing is therefore more likely to be the index of the channel symbol which was originally transmitted.

INDUSTRIAL APPLICATION

Our invention is capable of exploitation in industry, and can be made and used, whenever is it desired to detect whether a wireless receiver has locked onto a significant multipath signal.

The individual components of the apparatus and method shown herein, taken separate and apart from one another, may be entirely conventional, it being their combination which we claim as our invention.

While we have describe various modes of apparatus and method, the true spirit and scope of our invention are not limited thereto, but are limited only by the following claims and their equivalents; and we claim such as our invention.

We claim:

1. In a receiver which is adapted to receive multipath signals and includes a plurality of fingers, each finger being adapted to:
   a) separately demodulate a current received signal from each separate path; and
   b) measure a comparison energy between the current received signal as received by that finger and each possible channel symbol in a library of channel symbols;
the improvement comprising:
   c) a plurality of energy storage units, wherein each energy storage unit is associated with a finger and is adapted to:
      i) store a measurement of the comparison energy between each possible channel symbol and a previous received signal as received by that finger;
      ii) receive an index from the below-recited combiner, the index uniquely determining one possible channel symbol;
      iii) decide whether the comparison energy between the determined channel symbol and the previous received signal is significant; and
      iv) apply a scaled version of the current received signal to the combiner if and only if the comparison energy is significant; and
   d) a combiner which is adapted to:
      i) combine the scaled versions of the current received signals into a combined signal;
      ii) measure a comparison energy between the combined signal and each possible channel symbol in the library of channel symbols;
      iii) determine an index for the channel symbol producing the maximum comparison energy with the combined signal;
      iv) feed back the index to the energy storage units; and
      v) pass on the index for further processing.

2. In a method for decoding multipath signals, the method including the steps of:
   a) separately demodulating a current received signal from each separate path; and
   b) measuring a comparison energy between the current received signal and each possible channel symbol in a library of channel symbols;
the improvement comprising the steps of:
   c) storing a measurement of the comparison energy between each possible channel symbol and a previous received signal as received by that finger;
   d) receiving an index from the below-recited feed-back step, the index uniquely determining one possible channel symbol;
   e) deciding whether the comparison energy between the determined channel symbol and the previous received signal is significant;
   f) applying a scaled version of the current received signal to the below-recited combining step if and only if the comparison energy is significant;
   g) combining the scaled versions of the current received signals into a combined signal;
   h) measuring a comparison energy between the combined signal and each possible channel symbol in the library of channel symbols;
   i) determining an index for the channel symbol producing the maximum comparison energy with the combined signal;
   j) feeding back the index to the above-recited receiving step; and
   k) passing on the index for further processing.

3. In apparatus for decoding multipath signals, the apparatus including:
   a) means for separately demodulating a current received signal from each separate path; and
   b) means for measuring a comparison energy between the current received signal and each possible channel symbol in a library of channel symbols;
the improvement comprising:
   c) means for storing a measurement of the comparison energy between each possible channel symbol and a previous received signal as received by that finger;
   d) means for receiving an index from the below-recited feed-back means, the index uniquely determining one possible channel symbol;
   e) means for deciding whether the comparison energy between the determined channel symbol and the previous received signal is significant;
   f) means for applying a scaled version of the current received signal to the below-recited combining means if and only if the comparison energy is significant;
   g) means for combining the scaled versions of the current received signals into a combined signal;
   h) means for measuring a comparison energy between the combined signal and each possible channel symbol in the library of channel symbols;
   i) means for determining an index for the channel symbol producing the maximum comparison energy with the combined signal;
   j) means for feeding back the index to the above-recited receiving means; and
   k) means for passing on the index for further processing.

* * * * *